US012611358B1

(12) United States Patent
Yin

(10) Patent No.: US 12,611,358 B1
(45) Date of Patent: Apr. 28, 2026

(54) MASSAGE DEVICE

(71) Applicant: SHENZHEN DINGDINGTANG TECHNOLOGY CO., LTD., Shenzhen (CN)

(72) Inventor: Zhanwei Yin, Shaodong (CN)

(73) Assignee: SHENZHEN DINGDINGTANG TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/389,258

(22) Filed: Nov. 14, 2025

(30) Foreign Application Priority Data

Sep. 19, 2025 (CN) ......................... 202511344929.0

(51) Int. Cl.
*A61H 19/00* (2006.01)
*A61H 23/02* (2006.01)

(52) U.S. Cl.
CPC ............. *A61H 19/44* (2013.01); *A61H 19/34* (2013.01); *A61H 23/02* (2013.01); *A61H 2201/0192* (2013.01)

(58) Field of Classification Search
CPC ........ A61H 19/00; A61H 19/30; A61H 19/34; A61H 19/40; A61H 19/44; A61H 19/50; A61H 23/02; A61H 23/0254; A61H 23/0263; A61H 2023/0209; A61H 2023/029
See application file for complete search history.

(56) References Cited

U.S. PATENT DOCUMENTS

2025/0318983 A1* 10/2025 Yan ........................ A61H 19/30

FOREIGN PATENT DOCUMENTS

CN 203842009 U 9/2014
CN 106539678 A 3/2017

* cited by examiner

*Primary Examiner* — Carrie R Dorna
(74) *Attorney, Agent, or Firm* — Ming Jiiang; OPENPTO US LLC

(57) ABSTRACT

A massage device includes a first massage assembly, a second massage assembly, and a connecting assembly, where the connecting assembly connects the first massage assembly and the second massage assembly, and the connecting assembly includes an elastic deformation segment. At least a portion of the deformation segment and the second massage assembly are respectively located on opposite sides of an axis L1 of the first massage assembly. The deformation segment deforms under force to cause position changes in a projection of the second massage assembly on the axis L1. A limiting structure is disposed on the connecting assembly, and the limiting structure restricts a motion stroke of the second massage assembly in an axial direction of the first massage assembly and defines a first limit position and a second limit position thereof. The massage device simultaneously fits and massages a relatively deep recessed area and an external area.

20 Claims, 12 Drawing Sheets

MASSAGE DEVICE

CROSS-REFERENCE OF RELATED APPLICATION

The present application claims the priority to Chinese Patent Application No. 202511344929.0 filed Sep. 19, 2025, which is incorporated herein by reference in its entirety.

TECHNICAL FIELD

The present disclosure relates to the technical field of healthcare massage equipment, and in particular to a massage device.

BACKGROUND

In massage therapy, the care of some specific cave-like areas of the human body is of great significance. These areas are usually recessed areas surrounded by large muscle groups with abundant nerves and blood vessels inside, and precise massage on them effectively promotes blood circulation, relaxes deep muscles, and relieves tension.

Currently, a significant technical difficulty exists in massaging such cave-like areas: A traditional massage device usually has a single function and hardly massages both an interior and a periphery of a cave-like area simultaneously. Some massage devices are provided with spherical or head-shaped massage heads that mainly act on outer peripheral edges of the cave-like areas and cannot effectively reach and stimulate inner walls of recessed areas, thereby resulting in superficial effects due to lack of massage depths. Some other devices with slender probes may be deeply inserted into interiors of massage areas, but have two major defects: First, during the insertion process, a probe squeezes peripheral tissues, and forcibly pushes a peripheral massage assembly (if any) away from the human body, thereby resulting in the loss of the massage effect on the peripheral tissues; and second, an insertion depth of the probe is usually limited by a rigid structure and cannot be adaptively adjusted according to an actual physiological curvature of the human body and a pressure applied by the user, which may cause discomfort or failure to reach the desired depth.

In other words, the prior art lacks a cooperative massage scheme: When an internal massage assembly attempts to insert deeper, fitting of an external massage assembly should not be hindered, but the insertion action should be skillfully utilized to drive or allow the adaptive adjustment of the external massage assembly, so as to achieve the dual goals of deep stimulation and comprehensive fitting simultaneously.

Therefore, there is an urgent need in the art for an innovative massage device specially adapted to a physiological structure of cave-like areas, and the design of linkage between the internal massage assembly and the external massage assembly aims to resolve the above contradiction between insertion and fitting.

SUMMARY

In view of the above problems, an objective of the present disclosure is to provide a massage device capable of simultaneously fitting and massaging a relatively deep recessed area and an external area, so as to solve the above problems.

The present disclosure is achieved by means of the following technical solution:

The present disclosure provides a massage device, and the massage device includes a first massage assembly, a second massage assembly, and a connecting assembly, where the first massage assembly is configured to massage a first massage area of a user; the second massage assembly is configured to massage a second massage area of the user, the first massage area is different from the second massage area, the connecting assembly connects the first massage assembly and the second massage assembly, and the connecting assembly includes an elastic deformation segment; at least a portion of the deformation segment and the second massage assembly are respectively located on opposite sides of an axis L1 of the first massage assembly; the deformation segment is configured to deform under force so as to cause position changes in a projection of the second massage assembly on the axis L1; and a limiting structure is disposed on the connecting assembly, and the limiting structure is configured to restrict a motion stroke of the second massage assembly in an axial direction of the first massage assembly and define a first limit position and a second limit position thereof.

According to the technical solutions in the embodiments of the present disclosure, a structure in which the first massage assembly is deeply inserted into the first massage area and the second massage assembly fits the second massage area, in combination with the cooperative action, achieves the synchronization of internal deep stimulation and external massage relaxation, and overcomes the defect of a monotonous stimulation effect of a traditional device that only massages an outer periphery or only massages a deeper interior area. An elastic reaction force generated when the deformation segment deforms and the constraints of the limiting structure on an axial stroke ensure that the second massage assembly always tightly abuts against the second massage area, and even if the first massage assembly is deeply inserted into the first massage area, the second massage assembly does not detach, thereby ensuring a continuous and stable massage effect on the second massage area. The first massage assembly is not blocked by components such as the second massage assembly, and independently is deeply inserted into the first massage area, where a depth of insertion may be adjusted based on different pressing forces, to adapt to recess depths of different users, thereby achieving the expected massage effect.

In some embodiments, at least a portion of the connecting assembly cooperates with the limiting structure to limit a deformation direction of the deformation segment.

According to the technical solutions in the embodiments of the present disclosure, the connecting assembly may include a guide portion connected to the deformation segment, and when the deformation segment deforms under force, the guide portion moves along a path defined by the limiting structure, such that the deformation segment is controlled to deform only in a preset direction (such as a radial direction close to or away from the first massage assembly), thereby preventing twisting or offset of the deformation segment in an unexpected direction.

In some embodiments, the connecting assembly further includes a support segment; the support segment has a J-shaped structure, a long side thereof is connected to the first massage assembly, and a short side thereof is connected to the deformation segment; the deformation segment is connected to the second massage assembly; and the limiting structure is configured to limit the deformation of the deformation segment along the long side of the support segment.

According to the technical solutions in the embodiments of the present disclosure, the long side of the J-shaped support segment is connected to the first massage assembly, which prevents shaking of the first massage assembly due to lack of support during further insertion, ensures the accuracy of internal massage, and solves the potential problem of component shaking during further insertion. The limiting structure limits the deformation along the long side of the support segment, and in combination with the force guidance of the J-shaped short side, the deformation segment deforms only in an insertion direction of the first massage assembly, thereby eliminating a lateral displacement and causing more stable fitting between the second massage assembly and the second massage area.

In some embodiments, the limiting structure is a first guide hole disposed on the long side of the support segment, and the deformation segment is inserted into the first guide hole.

According to the technical solutions in the embodiments of the present disclosure, the deformation segment is directly inserted into the first guide hole, thereby achieving a simpler structure (reducing the number of parts), and a more stable wrapping constraint of the hole wall on the deformation segment, and solving the potential problem that a complex constraint structure is prone to failure. A length direction of the first guide hole is completely consistent with that of the long side of the support segment, and the deformation segment, after insertion, bends only along the long side, thereby eliminating the lateral displacement (such as bending perpendicular to the long side) and further enhancing the stability of fitting between the second massage assembly and the second massage area.

In some embodiments, a size of the second massage assembly is larger than a diameter of the first guide hole to prevent the second massage assembly from penetrating through the first guide hole.

According to the technical solutions in the embodiments of the present disclosure, the size of the second massage assembly is larger than the diameter of the first guide hole, such that the second massage assembly remains outside the first guide hole, which ensures that the second massage assembly continuously fits the second massage area and solves the potential problem that the second massage assembly is offset and fails due to the bending deformation of the deformation segment. An edge of the first guide hole passively limits the second massage assembly, and when the deformation segment bends and deforms, the second massage assembly does not move too close to the long side of the support segment, thereby preventing the reduction of a tightly-abutting force due to excessive proximity; and additionally, pulling the second massage assembly into the first guide hole is prevented when the deformation segment bends, thereby ensuring the whole-process stability of the tightly-abutting force.

In some embodiments, the first massage assembly has an arc-shaped structure, and a bending direction thereof is consistent with one side where the second massage assembly is located.

According to the technical solutions in the embodiments of the present disclosure, an arc-shaped surface of the first massage assembly increases a stroke of the first massage area (the tissues inside the recess) than that of the straight assembly, which stretches deep muscle fibers more fully and enhances the massage effect. An arc-shaped bend of the first massage assembly and the second massage assembly are on a same side, and the second massage assembly tightly abuts against the second massage area stably, such that an opposite pinching force is formed between the two massage assemblies, where the pinching force acts on deep muscles between the first massage area and the second massage area. Compared with the traditional single pressing, this method relieves muscle tension faster and enhances the massage effect. A size of a portion of the deformation segment beyond the first guide hole first gradually increases and then gradually decreases due to the bending deformation, such that a movement path of the second massage assembly is synchronously adapted to the displacement of the second massage area caused by the offset of the opening of the cave-like area, and when the opening offsets, the size of the deformation segment beyond the first guide hole increases; and when the opening resets, the size of the deformation segment beyond the first guide hole decreases, which solves the potential problem that the second massage assembly is detached due to the offset of the opening and ensures continuous fitting throughout the massage process.

In some embodiments, the size of the second massage assembly is smaller than the diameter of the first guide hole, such that the second massage assembly penetrates through the first guide hole.

According to the technical solutions in the embodiments of the present disclosure, the size of the second massage assembly is smaller than the diameter of the first guide hole, such that the second massage assembly not only may penetrate through the first guide hole and fit one side area outside the recess for massage during use, but also may fit the other side area outside the recess for massage without need to penetrate through the first guide hole, which achieves targeted massage of different areas and meets various massage needs.

In some embodiments, a cross-section of the first guide hole is waist-shaped.

According to the technical solutions in the embodiments of the present disclosure, the waist-shaped cross-section limits rotation through the short axis, such that the deformation segment bends only in the preset direction (along the long side), and the second massage assembly always maintains a proper fitting posture, and solves the fitting failure problem caused by offset. The long axis of the waist-shaped cross-section is disposed in the direction of the long side of the support segment, which provides a linear guide channel for the deformation segment; and additionally, the parallel straight sides of the waist-shaped cross-section reduces a contact area between the deformation segment and the hole wall, decreases sliding friction, and prevents jamming, which is especially suitable for a scenario where the deformation segment bends and deforms frequently.

In some embodiments, the diameter of the first guide hole gradually increases in a direction away from the first massage assembly.

According to the technical solutions in the embodiments of the present disclosure, a large diameter of the distal end of the first guide hole provides a fault-tolerance space for the bending deformation of the deformation segment, and even if the deformation segment radially offsets due to a muscular reaction force and a slight deviation in user operation, smooth sliding at the distal end is ensured, which solves the potential problem that an equal-diameter hole is prone to offset and jamming, and is especially suitable for a scenario where the user cannot maintain uniform force application throughout the massage process. A small diameter of the proximal end ensures the guiding precision when the first massage assembly is inserted and the deformation segment initially deforms (which prevents the misalignment of the second massage assembly due to an initial offset); and the large diameter of the distal end is adapted to the dynamic offset during the massage process, and the combination of them not only ensures the initial accuracy but also achieves process smoothness. The large diameter of the distal end ensures that the contact area between the deformation segment and the hole wall is smaller than that at the proximal end (only partial contact), which reduces a frictional resistance during sliding, and reduces structural wear and prolongs the service life of the deformation segment especially in the scenario where the deformation segment deforms frequently.

In some embodiments, the size of the deformation segment gradually decreases from one end connected to the support segment to one end connected to the second massage assembly.

In some embodiments, a bent portion between the long side and the short side of the support segment is an arc-shaped transition.

In some embodiments, a power supply system configured to drive the first massage assembly and the second massage assembly to perform massage actions is disposed in the bent portion between the long side and the short side of the support segment.

In some embodiments, the limiting structure is a second guide hole formed on the deformation segment, and the long side of the support segment is inserted into the second guide hole.

According to the technical solutions in the embodiments of the present disclosure, the deformation segment is directly sleeved on the long side of the support segment through the second guide hole, there is no need to align a relative position between a hole of the support segment and the deformation segment, and during assembly, it is only necessary to sleeve the hole on the long side, which is suitable for mass assembly scenarios and improves efficiency.

In some embodiments, the deformation segment and the second massage assembly are detachably connected.

According to the technical solutions in the embodiments of the present disclosure, the detachable connection between the deformation segment and the second massage assembly allows the user to replace the second massage assembly according to different massage areas and different massage preferences (such as gentle pressing and deep stimulation), thereby enhancing the versatility of the massage device. When the second massage assembly is worn or the deformation segment is damaged, only the damaged second massage assembly or the deformation segment needs to be replaced separately without need to replace the entire connecting assembly (retaining the intact components such as the support segment and the first massage assembly), thereby reducing maintenance costs; and additionally, the detachable design facilitates the separate cleaning of the second massage assembly, and prevents bacterial growth, thereby enhancing the hygiene of use.

In some embodiments, the second massage assembly includes a first installation port, and a first accommodating cavity and a second accommodating cavity disposed in the second massage assembly; the first accommodating cavity is configured to install a driving mechanism for driving the second massage assembly to perform massage actions, the first accommodating cavity communicates with the second accommodating cavity, and the second accommodating cavity communicates with the first installation port; and the deformation segment is provided with an installation portion, and the installation portion extends into the second accommodating cavity through the first installation port and is snap-fitted with the second accommodating cavity.

In some embodiments, a partition portion configured to divide the two accommodating cavities is disposed between the first accommodating cavity and the second accommodating cavity; and the first accommodating cavity communicates with the second accommodating cavity through a second installation port disposed on the partition portion.

The present disclosure provides a massage device, and the massage device includes a first massage assembly, a second massage assembly, a connecting assembly, a limiting structure, and a locking assembly. The first massage assembly is configured to massage a first massage area of a user; the second massage assembly is configured to massage a second massage area of the user, and the first massage area is different from the second massage area; the connecting assembly connects the first massage assembly and the second massage assembly, the connecting assembly includes a support segment, the support segment has a J-shaped structure, a long side thereof is connected to the first massage assembly, and a length direction of the long side is parallel to an axis L1 of the first massage assembly; a limiting structure is disposed on the long side, and the limiting structure is configured to restrict a motion of the second massage assembly in a direction of the axis L1; and a locking assembly is disposed on the long side, and the locking assembly is configured to fix or loosen the second massage assembly.

In some embodiments, the connecting assembly further includes an elastic deformation segment; the support segment further includes a short side; the deformation segment is connected between the short side and the second massage assembly; at least a portion of the deformation segment and the second massage assembly are respectively located on opposite sides of an axis L1 of the first massage assembly; and the deformation segment is configured to deform under force so as to cause position changes in a projection of the second massage assembly on the axis L1.

In some embodiments, the limiting structure is a first guide hole disposed on the long side of the support segment, and the deformation segment is inserted into the first guide hole; and the locking assembly is disposed close to the first guide hole, and the locking assembly fixes the second massage assembly by restricting deformation of the deformation segment.

In some embodiments, the locking assembly includes a pair of clamping portions; and the pair of the clamping portions is configured to move synchronously toward or away from the deformation segment to clamp or release the deformation segment.

Additional aspects and advantages of the present disclosure will be set forth partially in the following description, which will become obvious in the following description, or may be learned by practice of the present disclosure.

BRIEF DESCRIPTION OF THE DRAWINGS

To describe the technical solution in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

Figure 1:
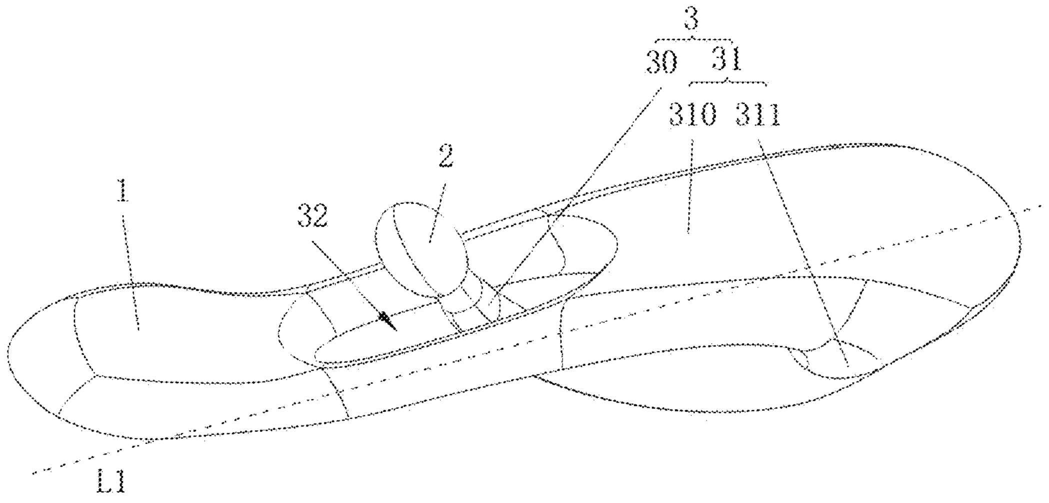
FIG. 1 is a schematic structural diagram of a massage device when a limiting structure is a first guide hole according to some embodiments of the present disclosure.

Reference numerals in the figures: 1—first massage assembly; 2—second massage assembly; 20—first installation port; 21—first accommodating cavity; 22—second accommodating cavity; 23—partition portion; 230—second installation port; 3—connecting assembly; 30—deformation segment; 300—installation portion; 31—support segment; 310—long side; 311—short side; 32—first guide hole; 33—second guide hole; 34—connecting segment; 4—locking assembly; and 40—clamping portion.

DETAILED DESCRIPTION OF PREFERRED EMBODIMENTS

In order to make the objectives, technical solutions and advantages of the embodiments of the present disclosure clearer, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific embodiments merely and are not intended to limit the present disclosure. The terms “including” and “having”, and any variations thereof in the specification, the claims and the above accompanying drawings are intended to cover non-exclusive inclusion. The terms “first”, “second” and the like in the specification and the claims or the above accompanying drawings are used to distinguish different objects and are not intended to indicate a specific order or hierarchical relationship.

When the term “example” is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the embodiments described herein can be combined with other embodiments.

In the description of the present disclosure, it is to be noted that, unless otherwise explicitly specified and defined, the terms “mounting”, “connected”, “connecting” and “attaching” are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term “and/or” in the present disclosure, which is merely an association relation describing an associated object, means that there maybe exist three relations, for example, A and/or B maybe represent three situations: A exists alone, A and B exist at the same time, and B exists alone. In addition, the character “/” mentioned in the present disclosure generally indicates that the associated objects are in an “or” relationship.

The term “a plurality of” used in the present disclosure refers to two or more (including two), and similarly, “a plurality of groups” refers to two or more groups (including two groups), and “a plurality of sheets” refers to two or more sheets (including two sheets).

According to some embodiments of the present disclosure, optionally, as shown in FIGS. 1 to 17, the present disclosure provides a massage device, and the massage device includes a first massage assembly 1, a second massage assembly 2, and a connecting assembly 3, where the first massage assembly 1 is configured to massage a first massage area of a user; the second massage assembly 2 is configured to massage a second massage area of the user, the first massage area is different from the second massage area, the connecting assembly 3 connects the first massage assembly 1 and the second massage assembly 2, and the connecting assembly 3 includes an elastic deformation segment 30; at least a portion of the deformation segment 30 and the second massage assembly 2 are respectively located on opposite sides of an axis L1 of the first massage assembly 1; the deformation segment 30 is configured to deform under force so as to cause position changes in a projection of the second massage assembly 2 on the axis L1; and a limiting structure is disposed on the connecting assembly 3, and the limiting structure is configured to restrict a motion stroke of the second massage assembly 2 in an axial direction of the first massage assembly 1 and define a first limit position and a second limit position thereof.

The first massage assembly 1 initially protrudes from the second massage assembly 2, such that the second massage assembly 2 comes into contact with the second massage area located outside a cave-like area only after the first massage assembly 1 extends into the cave-like area and comes into contact with the first massage area.

During use, the user aligns the first massage assembly 1 with an entrance to a recess of the cave-like area, such that the first massage assembly 1 extends into the first massage area (an interior of the recess) and initially comes into contact with an internal shallow layer thereof. After the first massage assembly 1 is inserted, the user pushes the entire massage device toward the second massage area, such that the second massage assembly 2 fits the second massage area (an outer portion of the cave-like area); when the user continues to apply a force, the second massage assembly 2 moves away from the first massage assembly 1 under the action of a reaction thrust from the second massage area, which causes the deformation segment 30 to bend and deform, and in this case, the deformation of the deformation segment 30 causes position changes in the projection of the second massage assembly 2 on the axis L1; and the deformation segment 30 generates an elastic reaction force, which continuously pushes the second massage assembly 2 to tightly abut against the second massage area until fitting without looseness, and the movement of the second massage assembly 2 does not go beyond the second limit position defined by the limiting structure. When the user needs to massage a deeper portion of the cave-like area through the first massage assembly 1, the user pushes the first massage assembly 1 deeper into the first massage area while keeping the second massage assembly 2 in a tight abutment state, and the second massage assembly 2 tightly abutting against the second massage area cannot move and only slides passively along the limiting structure (only slides between the first limit position and the second limit position due to limitation by the limiting structure), while the deformation segment 30 continuously pushes the second massage assembly 2 to tightly abut against, without detachment from the second massage area.

A structure in which the first massage assembly 1 is deeply inserted into the first massage area and the second massage assembly 2 fits the second massage area, in combination with the cooperative action, achieves the synchronization of internal deep stimulation and external massage relaxation, and overcomes the defect of a monotonous stimulation effect of a traditional device that only massages an outer periphery or only massages a deeper interior area. The elastic reaction force generated when the deformation segment 30 deforms and the constraints of the limiting structure on an axial stroke ensure that the second massage assembly 2 always tightly abuts against the second massage area, and even if the first massage assembly 1 is deeply inserted into the first massage area, the second massage assembly 2 does not detach, thereby ensuring a continuous and stable massage effect on the second massage area. The first massage assembly 1 is not blocked by components such as the second massage assembly 2, and independently is deeply inserted into the first massage area, where a depth of insertion may be adjusted based on different pressing forces, to adapt to recess depths of different users, thereby achieving the expected massage effect.

Figure 13:
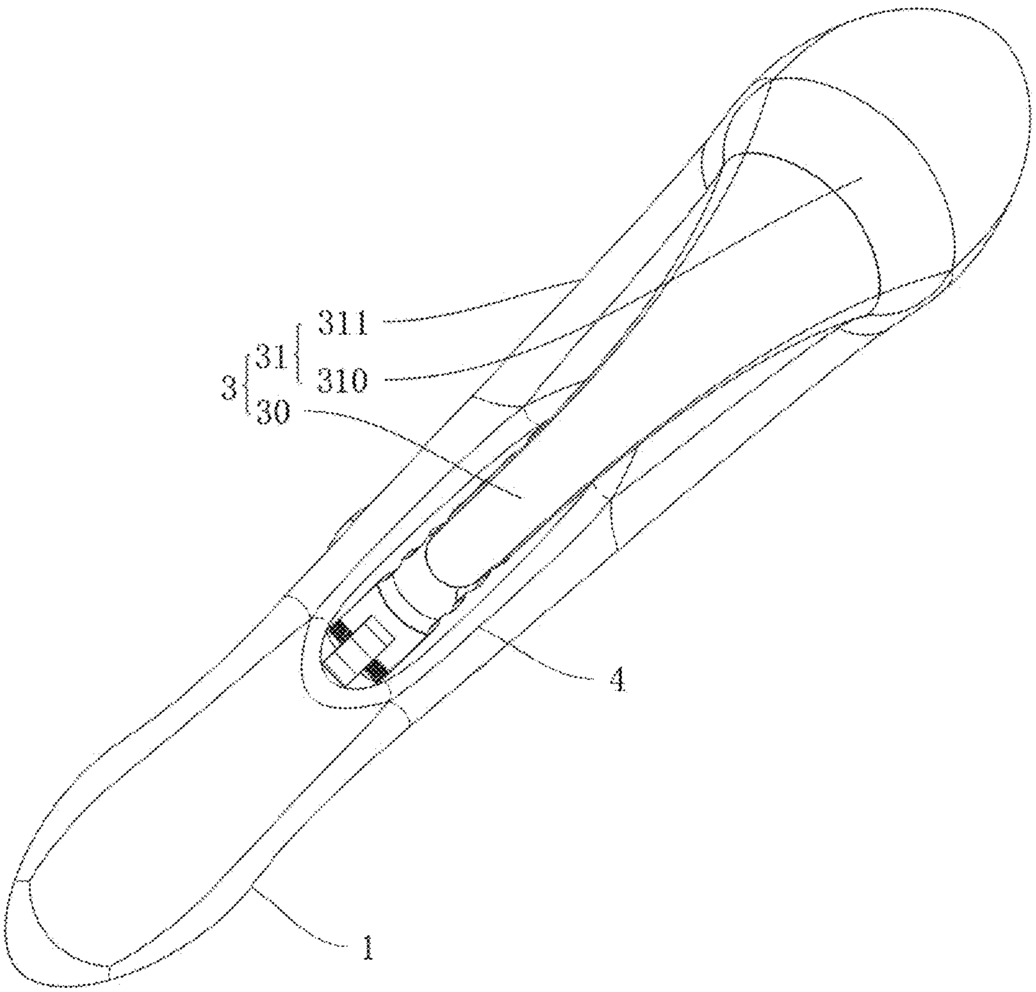
FIG. 13 is a side view of a massage device provided with a locking assembly according to some embodiments of the present disclosure.
Figure 14:
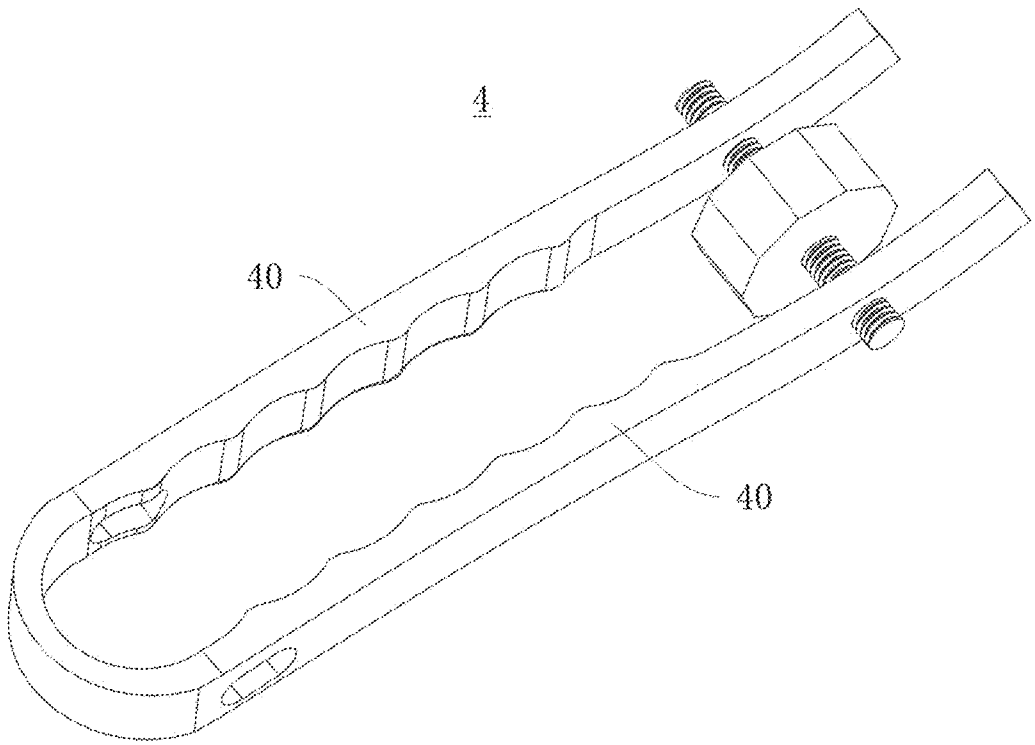
FIG. 14 is a schematic structural diagram of a locking assembly according to some embodiments of the present disclosure.

In a specific implementation process, as shown in FIG. 13, a locking assembly 4 is further arranged to limit the deformation of the deformation segment 30 so as to fix a position of the second massage assembly 2 (its fixed position is limited between the first limit position and the second limit position), such that the user may increase a force exerted by the second massage assembly 2 on the second massage area by pushing the connecting assembly 3, thereby meeting the user's demand for a massage intensity; and as shown in FIG. 14, the locking assembly 4 is disposed on an inner side of the first guide hole 32 and includes at least a pair of clamping portions 40, and the clamping portions 40 approach or move away from the deformation segment 30 simultaneously to clamp or loosen the deformation segment 30, so as to fix or loosen the second massage assembly 2.

According to some embodiments of the present disclosure, optionally, as shown in FIGS. 1 to 17, at least a portion of the connecting assembly 3 cooperates with the limiting structure to limit a deformation direction of the deformation segment 30.

Specifically, the connecting assembly 3 may include a guide portion 31 connected to the deformation segment 30, and when the deformation segment 30 deforms under force, the guide portion 31 moves along a path defined by the limiting structure, such that the deformation segment 30 is controlled to deform only in a preset direction (such as a radial direction close to or away from the first massage assembly 1), thereby preventing twisting or offset of the deformation segment 30 in an unexpected direction.

In a specific implementation process, a direction of the limiting structure may be adjusted, and the deformation direction of the deformation segment 30 may be adjusted synchronously by adjusting an included angle between the limiting structure and the axis L1 or adjusting an extending direction, such that the second massage assembly 2 adapts to the second massage areas at different positions and angles, thereby enhancing the adaptability of the massage device.

According to some embodiments of the present disclosure, optionally, as shown in FIGS. 1 to 17, the connecting assembly 3 further includes a support segment 31; the support segment 31 has a J-shaped structure, a long side 310 thereof is connected to the first massage assembly 1, and a short side 311 thereof is connected to the deformation segment 30; the deformation segment 30 is connected to the second massage assembly 2; and the limiting structure is configured to limit the deformation of the deformation segment 30 along the long side 310 of the support segment 31.

The support segment 31 has certain structural stability, and a bent portion of the J-shaped structure facilitates gripping by the user, such that the user may hold the support segment 31 to push the first massage assembly 1 and the second massage assembly 2 to fit a corresponding massage area.

After the first massage assembly 1 is deeply inserted into the first massage area, a portion of the long side 310 of the support segment 31 may also extend into the first massage area to control and pull the first massage assembly 1.

During use, the user pushes the first massage assembly 1 into the entrance to the recess after aligning, the long side 310 of the support segment 31 extends synchronously with the first massage assembly 1 (providing stable support to prevent the first massage assembly 1 from shaking), and the short side 311 drives the deformation segment 30 and the second massage assembly 2 to remain outside the recess at an optimal position (without blocking the entrance), thereby ensuring that the first massage assembly 1 smoothly extends into the shallow layer of the first massage area. After the first massage assembly 1 is inserted, the user continues to push the massage device until the second massage assembly 2 comes into contact with the second massage area, and after the second massage assembly 2 fits the second massage area, a reaction thrust drives the deformation segment 30 to deform along the long side 310 of the support segment 31; and due to the limitation by the limiting structure, the deformation segment 30 bends and deforms only along the long side 310, the short side 311 of the support segment 31 provides a stable force-bearing fulcrum for the deformation segment 30, and the elastic reaction force of the deformation segment 30 continuously pushes the second massage assembly 2 to tightly abut against the second massage area. When the first massage assembly 1 continues to be deeply inserted into the first massage area, the user pushes the first massage assembly 1 to move further into the recess while keeping the second massage assembly 2 in the tight abutment state, and the long side 310 of the support segment 31 goes deep synchronously with the first massage assembly 1; and the deformation segment 30 still bends and deforms along the long side 310, the limiting structure ensures that the deformation segment 30 does not deviate from the long side 310, and the second massage assembly 2 follows passively along the long side 310 and always fits the second massage area to achieve stable and effective massage.

The long side 310 of the J-shaped support segment 31 is connected to the first massage assembly 1, which prevents shaking of the first massage assembly 1 due to lack of support during further insertion, ensures the accuracy of internal massage, and solves the potential problem of component shaking during further insertion. The limiting structure limits the deformation along the long side 310 of the support segment 31, and in combination with the force guidance of the J-shaped short side 311, the deformation segment 30 deform only in an insertion direction of the first massage assembly 1, thereby eliminating a lateral displacement and causing more stable fitting between the second massage assembly 2 and the second massage area.

In a specific implementation process, joints of the support segment 31 with the first massage assembly 1 and the deformation segment 30 are in smooth transition; and a size of the first massage assembly 1 gradually increases in a direction away from the support segment 31, and a size of the deformation segment 30 gradually decreases in the direction away from the support segment 31.

Figure 7:
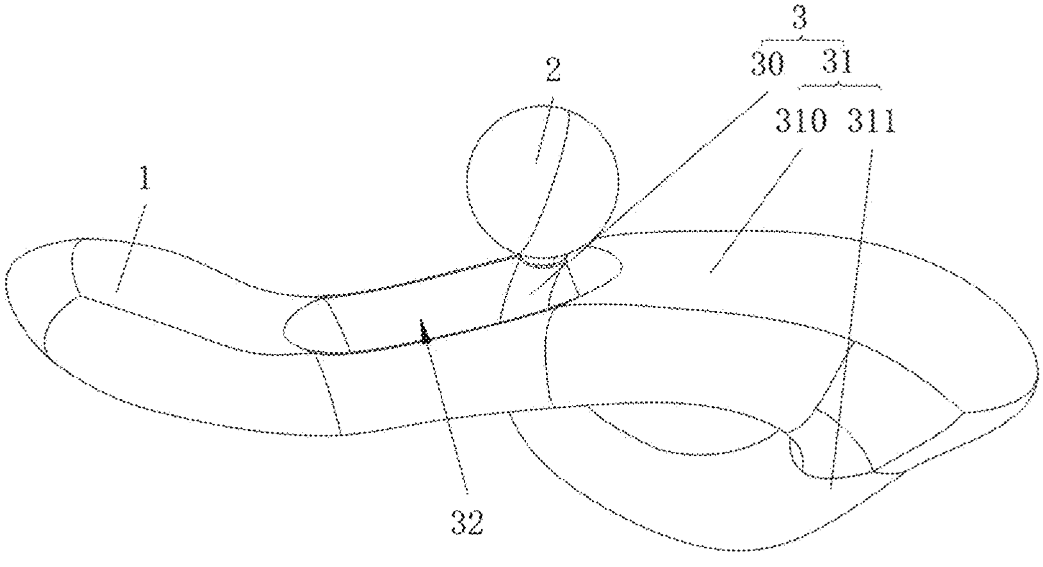
FIG. 7 is a schematic structural diagram of a massage device when a second massage assembly is at a second limit position according to still other embodiments of the present disclosure.
Figure 8:
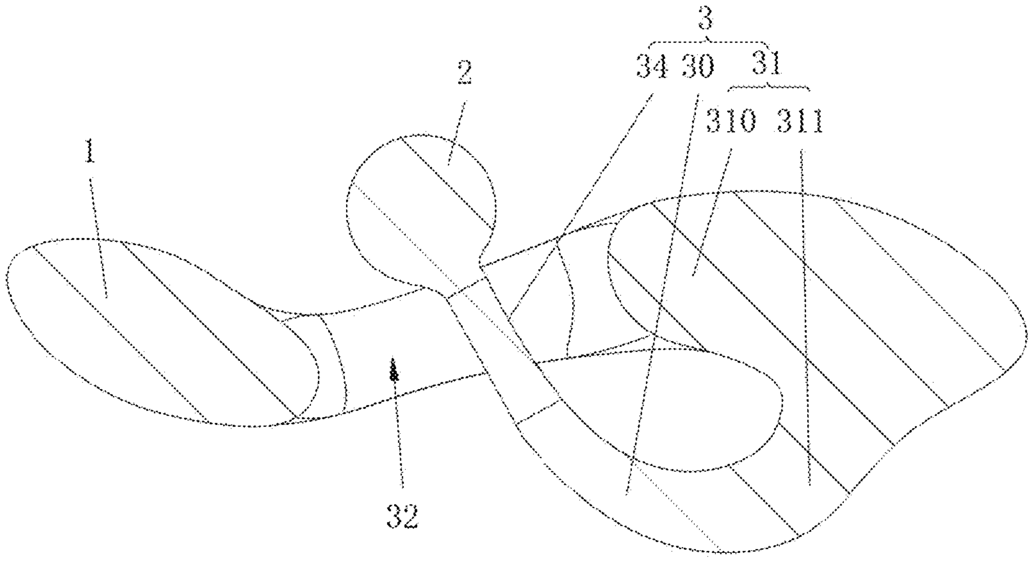
FIG. 8 is a schematic structural diagram of a massage device further including a connecting segment according to still other embodiments of the present disclosure.
Figure 9:
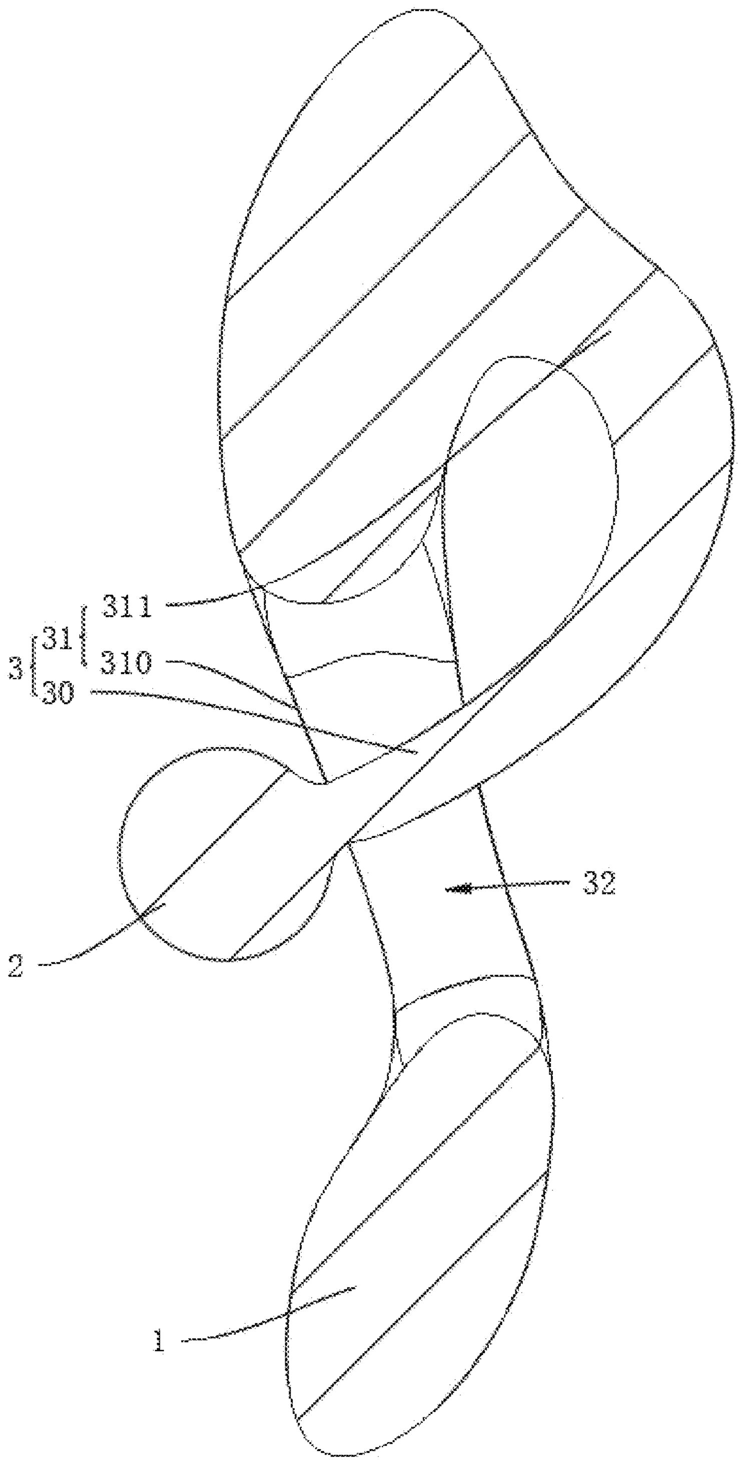
FIG. 9 is a sectional view of a massage device when a limiting structure is a first guide hole according to other embodiments of the present disclosure.

In a specific implementation process, as shown in FIG. 7, the deformation segment 30 may be connected to the second massage assembly 2 through a hard connecting segment 34, the hard connecting segment 34 is inserted into the first guide hole 32, and the elastic deformation segment 30 and the second massage assembly 2 are oppositely arranged around the axis L1, thereby preventing the irregular deformation of the elastic deformation segment 30 in the first guide hole 32.

The first massage assembly 1 may be in the shape of a sphere, a columnar structure, a leaf-shaped structure, or the like.

According to some embodiments of the present disclosure, optionally, as shown in FIGS. 1 to 9, the limiting structure is the first guide hole 32 disposed on the long side 310 of the support segment 31, and the deformation segment 30 is inserted into the first guide hole 32.

During use, the user pushes the first massage assembly 1 into the entrance to the recess after aligning, the long side 310 of the support segment 31 extends synchronously with the first massage assembly 1, and the short side 311 drives the deformation segment 30 (inserted into the first guide hole 32) and the second massage assembly 2 to remain outside the recess (without blocking the entrance); and the first guide hole 32 achieves initial positioning for the deformation segment 30 to prevent shaking thereof, so as to ensure that the first massage assembly 1 smoothly extends into the shallow layer of the first massage area. After the first massage assembly 1 is inserted, the user pushes the massage device until the second massage assembly 2 comes into contact with the second massage area, and after the second massage assembly 2 fits a muscle group, a reaction thrust drives the deformation segment 30 to deform along the long side 310 of the support segment 31; and since the deformation segment 30 is inserted into the first guide hole 32, the deformation segment 30 bends and deforms only along the long side 310 (no lateral displacement) due to limitation by a hole wall of the first guide hole 32, the short side 311 of the support segment 31 and the first guide hole 32 together provide a bidirectional force constraint for the deformation segment 30, and the elastic reaction force of the deformation segment 30 continuously pushes the second massage assembly 2 to tightly abut against the second massage area. When the first massage assembly 1 continues to be deeply inserted into the first massage area, the user pushes the first massage assembly 1 to move further into the recess while keeping the second massage assembly 2 in the tight abutment state, the long side 310 of the support segment 31 goes deep synchronously with the first massage assembly 1, and the first guide hole 32 always cooperates with the deformation segment 30; and the deformation segment 30 continues to bend and deform along an axis of the first guide hole 32, the hole wall of the first guide hole 32 continuously limits a deformation direction, and the second massage assembly 2 follows passively along the long side 310 and always fits the second massage area to achieve stable and effective massage.

The deformation segment 30 is directly inserted into the first guide hole 32, thereby achieving a simpler structure (reducing the number of parts), and a more stable wrapping constraint of the hole wall on the deformation segment 30, and solving the potential problem that a complex constraint structure is prone to failure. A length direction of the first guide hole 32 is completely consistent with that of the long side 310 of the support segment 31, and the deformation segment 30, after insertion, bends only along the long side 310, thereby eliminating the lateral displacement (such as bending perpendicular to the long side 310) and further enhancing the stability of fitting between the second massage assembly 2 and the second massage area.

In a specific implementation process, a plurality of detachable limiting members may be arranged in the first guide hole 32, the user may install or remove the corresponding limiting members according to needs to control a maximum deformation degree of the deformation segment 30, and when the deformation of the deformation segment 30 is limited by the limiting members, the first massage assembly 1 cannot continue to be deeply inserted into the first massage area, thereby preventing the user from being injured due to the excessive insertion into or excessive pressure of the first massage assembly 1 on the first massage area.

According to some embodiments of the present disclosure, optionally, as shown in FIGS. 4 to 9, a size of the second massage assembly 2 is larger than a diameter of the first guide hole 32 to prevent the second massage assembly from penetrating through the first guide hole 32.

After the first massage assembly 1 is inserted, the user pushes the second massage assembly 2 to fit the second massage area, the second massage assembly 2 is driven by the reaction thrust to push the deformation segment 30, and the deformation segment 30 bends and deforms along the first guide hole 32; and in this case, the second massage assembly 2 approaches the first guide hole 32 along with the bending of the deformation segment 30, but since the size thereof is larger than the diameter of the first guide hole 32, an edge of the first guide hole 32 mechanically limits the second massage assembly 2, which prevents the second massage assembly 2 from passing through the first guide hole 32 by itself (i.e., disengaging from the first guide hole 32), and ensures that the second massage assembly 2 is always on a side directly facing the second massage area (outside the hole), and the elastic reaction force of the deformation segment 30 may stably act on the second massage assembly 2 to achieve tight abutment.

The size of the second massage assembly 2 is larger than the diameter of the first guide hole 32, such that the second massage assembly 2 remains outside the first guide hole 32, which ensures that the second massage assembly 2 continuously fits the second massage area and solves the potential problem that the second massage assembly 2 is offset and fails due to the bending deformation of the deformation segment 30. The edge of the first guide hole 32 passively limits the second massage assembly 2, and when the deformation segment 30 bends and deforms, the second massage assembly 2 does not move too close to the long side 310 of the support segment 31, thereby preventing the reduction of a tightly-abutting force due to excessive proximity; and additionally, pulling the second massage assembly 2 into the first guide hole 32 is prevented when the deformation segment 30 bends, thereby ensuring the whole-process stability of the tightly-abutting force.

According to some embodiments of the present disclosure, optionally, as shown in FIGS. 4 to 9, the first massage assembly 1 has an arc-shaped structure, and a bending direction thereof is consistent with one side where the second massage assembly 2 is located.

During use, the user pushes the arc-shaped first massage assembly 1 to extend into the recess, a concave surface of the first massage assembly 1 fits an inner wall of the cave-like area, and since an arc-shaped contact area is larger than a contact area of a straight assembly, the first massage assembly 1 initially pushes the first massage area (tissues on the inner wall of the recess) to move. After the first massage assembly 1 is inserted, the user pushes the second massage assembly 2 to fit the second massage area, the deformation segment 30 bends under force, and the elastic reaction force causes the second massage assembly 2 to continuously tightly abut against the second massage area; and in this case, the arc-shaped concave surface of the first massage assembly 1 is tightly attached to the inner wall of the recess, and the second massage assembly 2 is tightly attached to the external second massage area, which forms a foundation for opposite force application of pushing inside and abutting against outside. The user pushes the first massage assembly 1 to move further into the recess, and due to the surface contact characteristic of the arc-shaped concave surface, the first massage area (the inner wall of the recess and surrounding tissues) is synchronously pushed to move toward a center of the recess to stretch deep muscles; and additionally, the second massage assembly 2 cannot move inward because of tightly abutting against the external second massage area, such that a pinching force is generated by pushing outward through the first massage assembly 1 and abutting against inward through the second massage assembly 2, and the pinching force acts on muscle tissues between the two massage assemblies, which achieves a deep relaxation effect similar to manual pinching and relieves muscle tension. As the first massage assembly 1 is further inserted, the arc-shaped concave surface pushes an opening of the cave-like area (the entrance to the recess) to deflect toward its own bending direction, such that the second massage area displaces synchronously with the offset of the opening; and in this case, the bending deformation of the deformation segment 30 drives the second massage assembly 2 to extend outward along the first guide hole 32, such that a distance between the second massage assembly 2 and the first guide hole 32 gradually increases, thereby ensuring that the second massage assembly 2 always fits the displaced second massage area. When the first massage assembly 1 is inserted deeper relatively, an effect of pushing the opening through the arc-shaped portion is weakened, the opening of the cave-like area gradually resets under the action of muscle elasticity, and the second massage area moves back to an original position accordingly; and the second massage assembly 2 approaches the first guide hole 32 along with the continuous bending of the deformation segment 30, and a distance between the second massage assembly 2 and the first guide hole 32 gradually decreases, to continuously fit the reset second massage area without looseness throughout the process.

An arc-shaped surface of the first massage assembly 1 increases a stroke of the first massage area (the tissues inside the recess) than that of the straight assembly, which stretches deep muscle fibers more fully and enhances the massage effect. An arc-shaped bend of the first massage assembly 1 and the second massage assembly 2 are on a same side, and the second massage assembly 2 tightly abuts against the second massage area stably, such that an opposite pinching force is formed between the two massage assemblies, where the pinching force acts on deep muscles between the first massage area and the second massage area. Compared with the traditional single pressing, this method relieves muscle tension faster and enhances the massage effect. A size of a portion of the deformation segment 30 beyond the first guide hole 32 first gradually increases and then gradually decreases due to the bending deformation, such that a movement path of the second massage assembly 2 is synchronously adapted to the displacement of the second massage area caused by the offset of the opening of the cave-like area, and when the opening offsets, the size of the deformation segment 30 beyond the first guide hole 32 increases; and when the opening resets, the size of the deformation segment 30 beyond the first guide hole 32 decreases, which solves the potential problem that the second massage assembly 2 is detached due to the offset of the opening and ensures continuous fitting throughout the massage process.

In a specific implementation process, a curvature of the first massage assembly 1 may gradually decrease in a direction away from the support segment 31, a low-curvature portion of the first massage assembly 1 ensures smooth insertion thereof, and a high-curvature portion increases a distance of pushing tissues in the depth of the recess through the first massage assembly 1, and enhances a directional offset effect on the opening.

Figure 2:
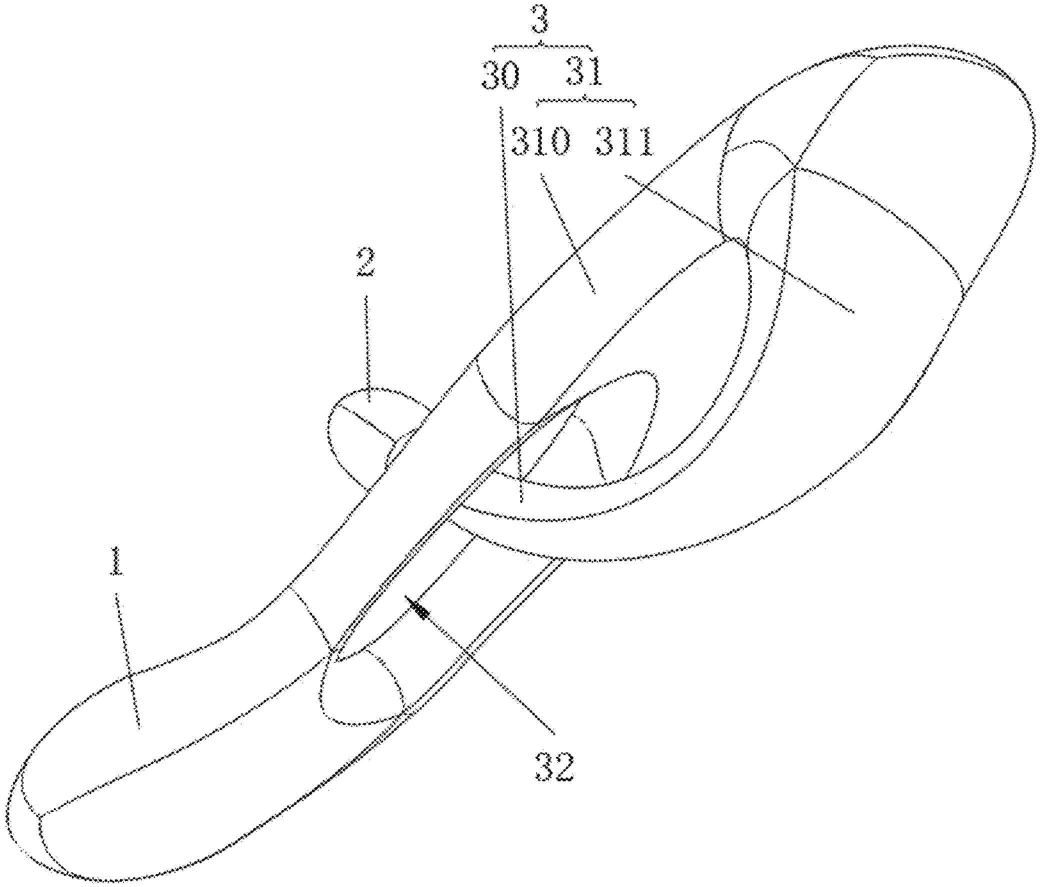
FIG. 2 is a schematic structural diagram of a massage device when a limiting structure is a first guide hole according to other embodiments of the present disclosure.
Figure 3:
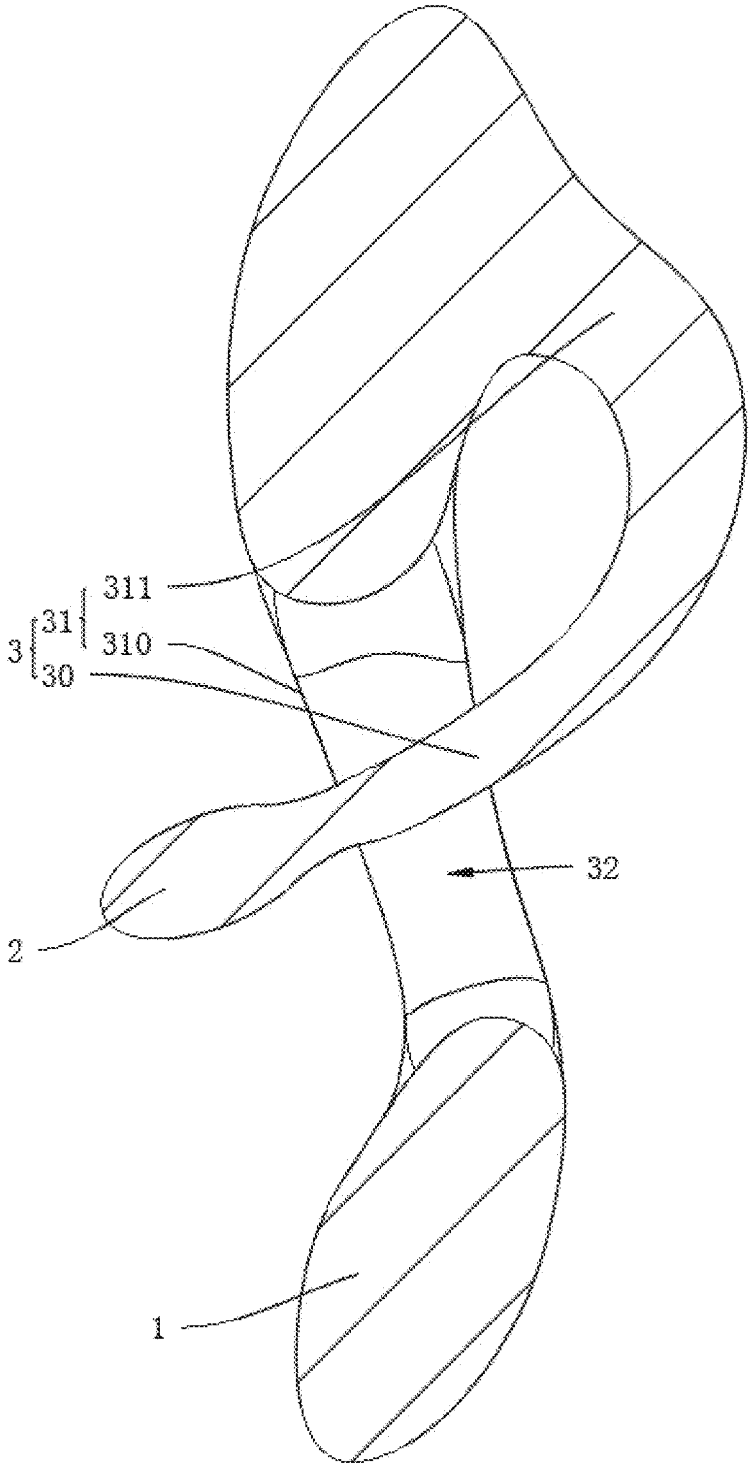
FIG. 3 is a sectional view of a massage device when a limiting structure is a first guide hole according to some embodiments of the present disclosure.

According to some embodiments of the present disclosure, optionally, as shown in FIGS. 1 to 3, the size of the second massage assembly 2 is smaller than the diameter of the first guide hole 32, such that the second massage assembly penetrates through the first guide hole 32.

The size of the second massage assembly 2 is smaller than the diameter of the first guide hole 32, such that the second massage assembly 2 not only may penetrate through the first guide hole 32 and fit one side area outside the recess for massage during use, but also may fit the other side area outside the recess for massage without need to penetrate through the first guide hole 32, which achieves targeted massage of different areas and meets various massage needs.

Figure 4:
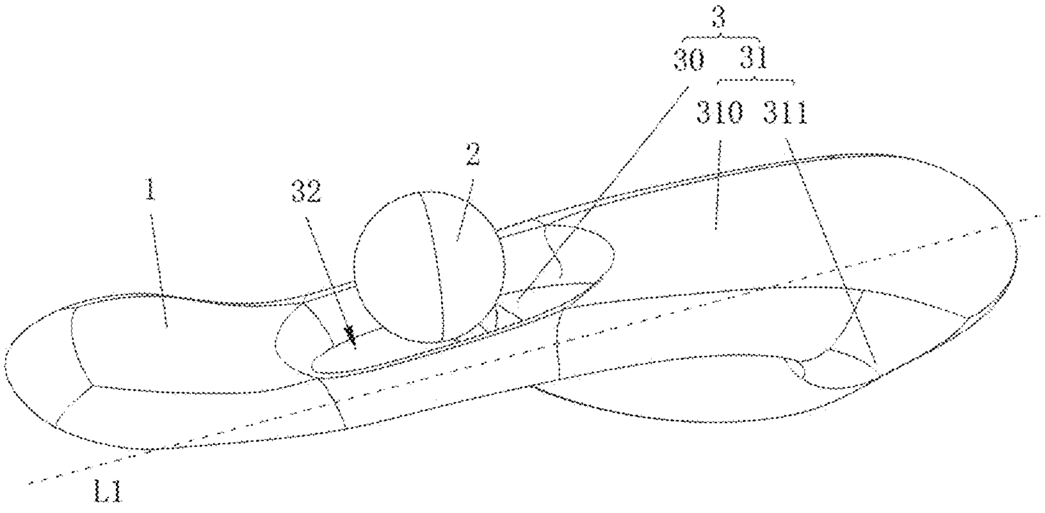
FIG. 4 is a schematic structural diagram of a massage device when a limiting structure is a first guide hole according to yet other embodiments of the present disclosure.
Figure 5:
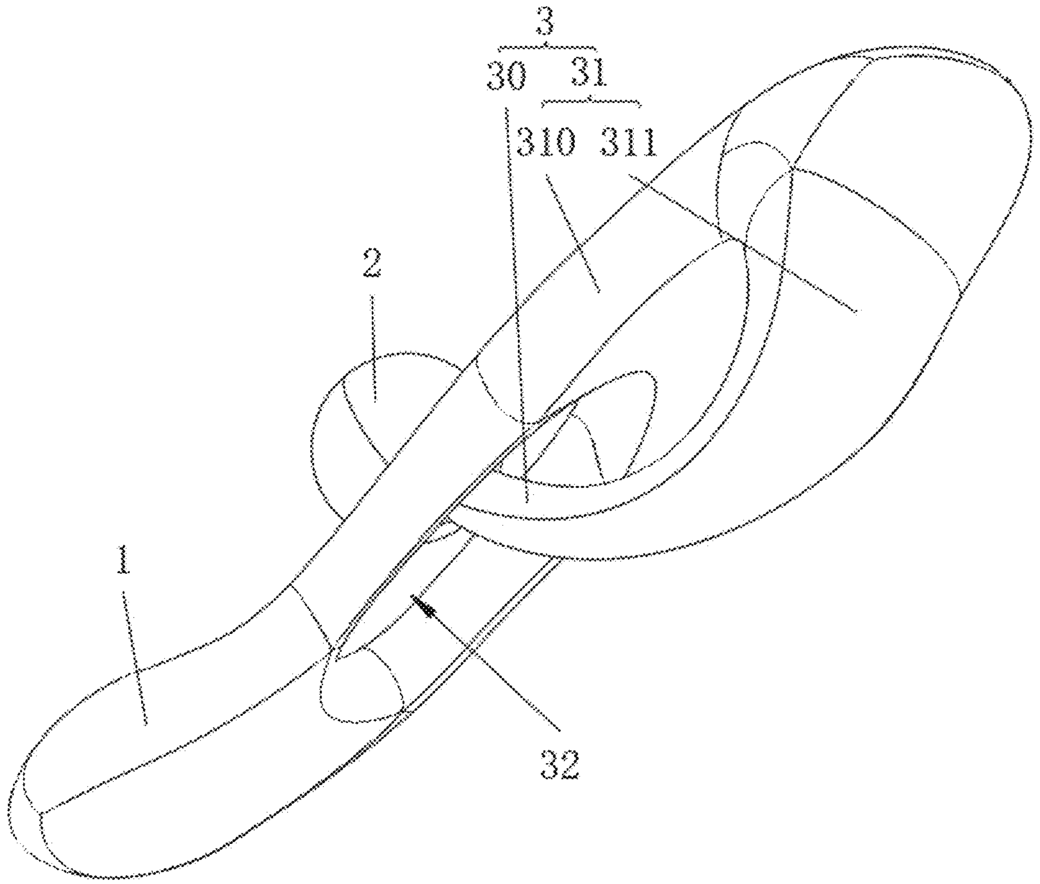
FIG. 5 is a schematic structural diagram of a massage device when a limiting structure is a first guide hole according to still other embodiments of the present disclosure.
Figure 6:
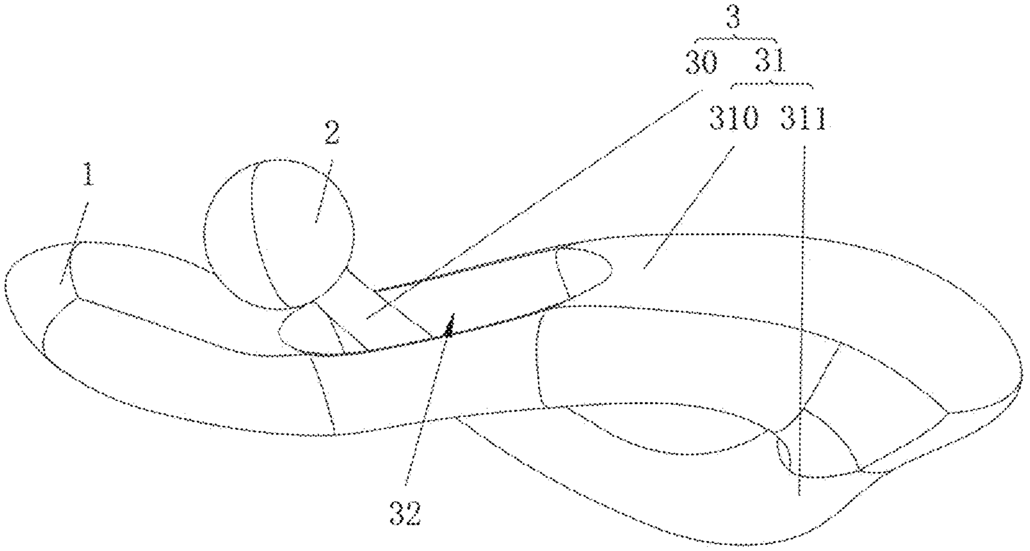
FIG. 6 is a schematic structural diagram of a massage device when a second massage assembly is at a first limit position according to still other embodiments of the present disclosure.

According to some embodiments of the present disclosure, optionally, as shown in FIGS. 4 and 5, a cross-section of the first guide hole 32 is waist-shaped.

The waist-shaped cross-section is composed of two semicircles (with a diameter being a short axis) and two parallel straight lines (with a length being a long axis), a direction of the long axis is completely consistent with a direction of the long side 310 of the support segment 31 (to ensure the matching of guiding direction), and a direction of the short axis is perpendicular to the long side 310.

The waist-shaped cross-section limits rotation through the short axis, such that the deformation segment 30 bends only in the preset direction (along the long side 310), and the second massage assembly 2 always maintains a proper fitting posture, and solves the fitting failure problem caused by offset. The long axis of the waist-shaped cross-section is disposed in the direction of the long side 310 of the support segment 31, which provides a linear guide channel for the deformation segment 30; and additionally, the parallel straight sides of the waist-shaped cross-section reduces a contact area between the deformation segment 30 and the hole wall, decreases sliding friction, and prevents jamming, which is especially suitable for a scenario where the deformation segment 30 bends and deforms frequently.

According to some embodiments of the present disclosure, optionally, the diameter of the first guide hole 32 gradually increases in a direction away from the first massage assembly 1.

The diameter of the first guide hole 32 gradually increases in the direction away from the first massage assembly 1 (from a proximal end to a distal end thereof), the diameter of the proximal end (one side close to the first massage assembly 1) is the smallest, and the diameter of the distal end (one side away from the first massage assembly 1) is the largest; and the long axis of the first guide hole 32 is consistent with the direction of the long side 310 of the support segment 31 throughout the process, and an inner wall thereof is a smoothly transitional conical surface, which achieves a dual constraint effect of precise guiding at the proximal end and fault-tolerant sliding at the distal end.

A large diameter of the distal end of the first guide hole 32 provides a fault-tolerance space for the bending deformation of the deformation segment 30, and even if the deformation segment 30 radially offsets due to a muscular reaction force and a slight deviation in user operation, smooth sliding at the distal end is ensured, which solves the potential problem that an equal-diameter hole is prone to offset and jamming, and is especially suitable for a scenario where the user cannot maintain uniform force application throughout the massage process. A small diameter of the proximal end ensures the guiding precision when the first massage assembly 1 is inserted and the deformation segment 30 initially deforms (which prevents the misalignment of the second massage assembly 2 due to an initial offset); and the large diameter of the distal end is adapted to the dynamic offset during the massage process, and the combination of the proximal end and the distal end not only ensures the initial accuracy but also achieves process smoothness. The large diameter of the distal end ensures that the contact area between the deformation segment 30 and the hole wall is smaller than that at the proximal end (only partial contact), which reduces a frictional resistance during sliding, and reduces structural wear and prolongs the service life of the deformation segment 30 especially in the scenario where the deformation segment 30 deforms frequently.

According to some embodiments of the present disclosure, optionally, as shown in FIGS. 8 to 11, the size of the deformation segment 30 gradually decreases from one end connected to the support segment 31 to one end connected to the second massage assembly 2.

A thick end of the deformation segment 30 is connected to the support segment 31 and bears a pressure transmitted by the first massage assembly 1 (preventing fracture); and a thin end thereof is connected to the second massage assembly 2, which provides a small deformation resistance (flexibly following the insertion action), and solves the problem that the elastic deformation segment 30 easily breaks when being too rigid, and easily causes the second massage assembly 2 to deviate from the second massage area when being too flexible.

According to some embodiments of the present disclosure, optionally, a bent portion between the long side 310 and the short side 311 of the support segment 31 is an arc-shaped transition.

The arc-shaped transition disperses a stress to the entire arc-shaped surface, such that the support segment 31 prevents localized overload while maintaining rigidity, prolongs the overall service life of the support segment 31, and prevents failure of the massage device due to the damage to the support segment 31. The arc-shaped transition enables the smooth force transmission between the long side 310 and the short side 311 of the support segment 31, and when the deformation segment 30 deforms, the second massage assembly 2 is not offset due to jamming at a bent portion, which remains stable a peripheral fitting rate, and ensures that the deep massage of the first massage assembly 1 on the cave-like area remains synchronized with the fitting between the first massage assembly 1 and the peripheral second massage area.

According to some embodiments of the present disclosure, optionally, a power supply system configured to drive the first massage assembly 1 and the second massage assembly 2 to perform massage actions is disposed in the bent portion between the long side 310 and the short side 311 of the support segment 31.

In the present disclosure, the power supply system is integrated in the bent portion, and is not in contact interference with linkage components (the deformation segment 30 and the two massage assemblies), thereby improving the power supply stability. The power supply system is located in the bent portion (not directly in contact with skin of the user) and is far away from the first massage assembly 1 and the second massage assembly 2 that are fitted with the massage area, thereby preventing the risk of skin scald or electric leakage caused by friction and extrusion of the power supply system; and additionally, a housing of the support segment 31 isolates slight heating of a power supply module, such that the user uses for a long time without skin burning sensation.

Figure 15:
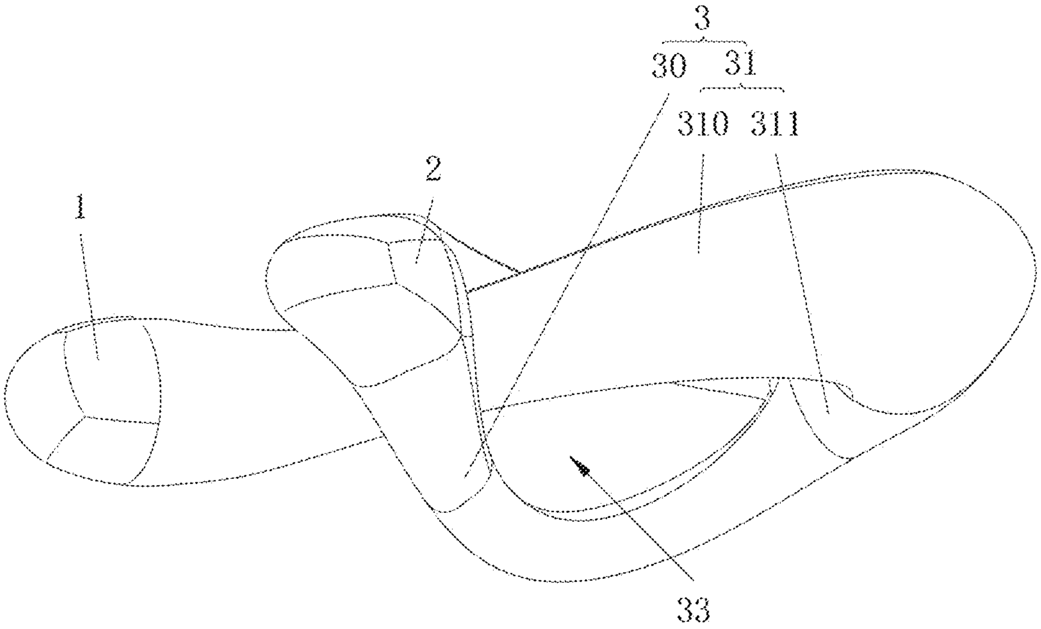
FIG. 15 is a schematic structural diagram of a massage device when a limiting structure is a second guide hole according to some embodiments of the present disclosure.
Figure 16:
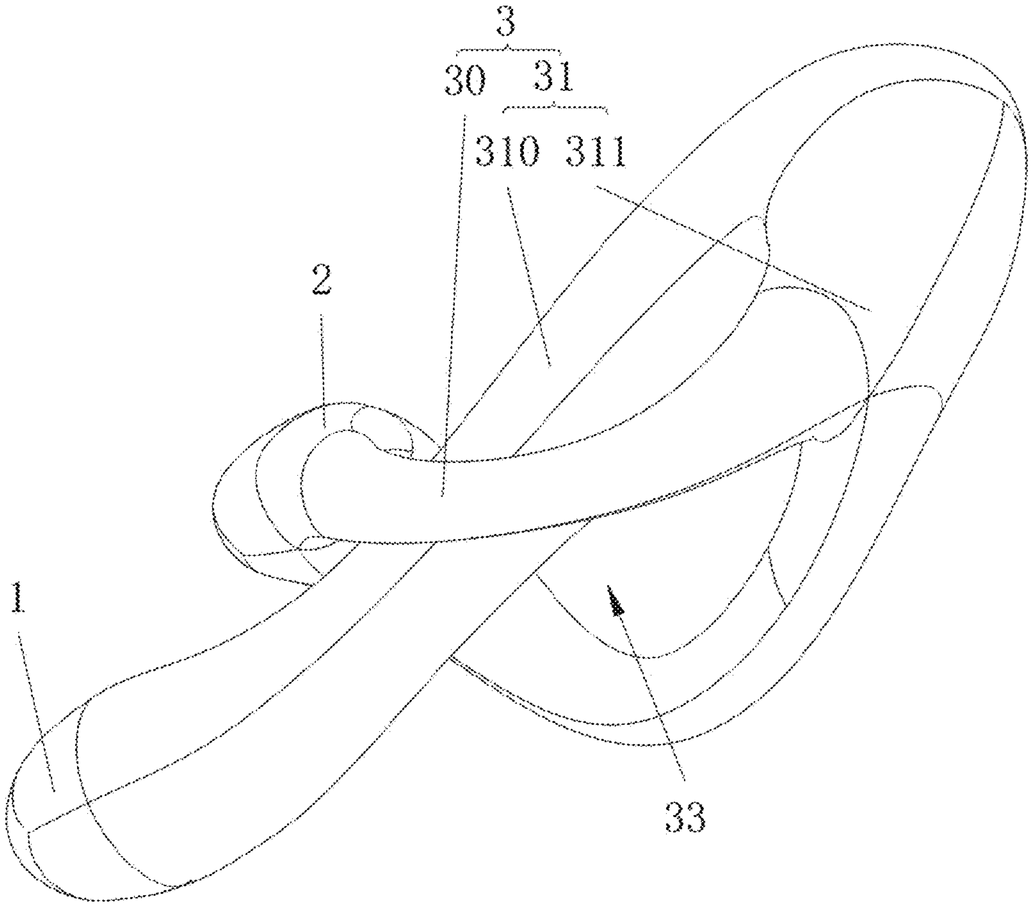
FIG. 16 is a schematic structural diagram of a massage device when a limiting structure is a second guide hole according to other embodiments of the present disclosure.
Figure 17:
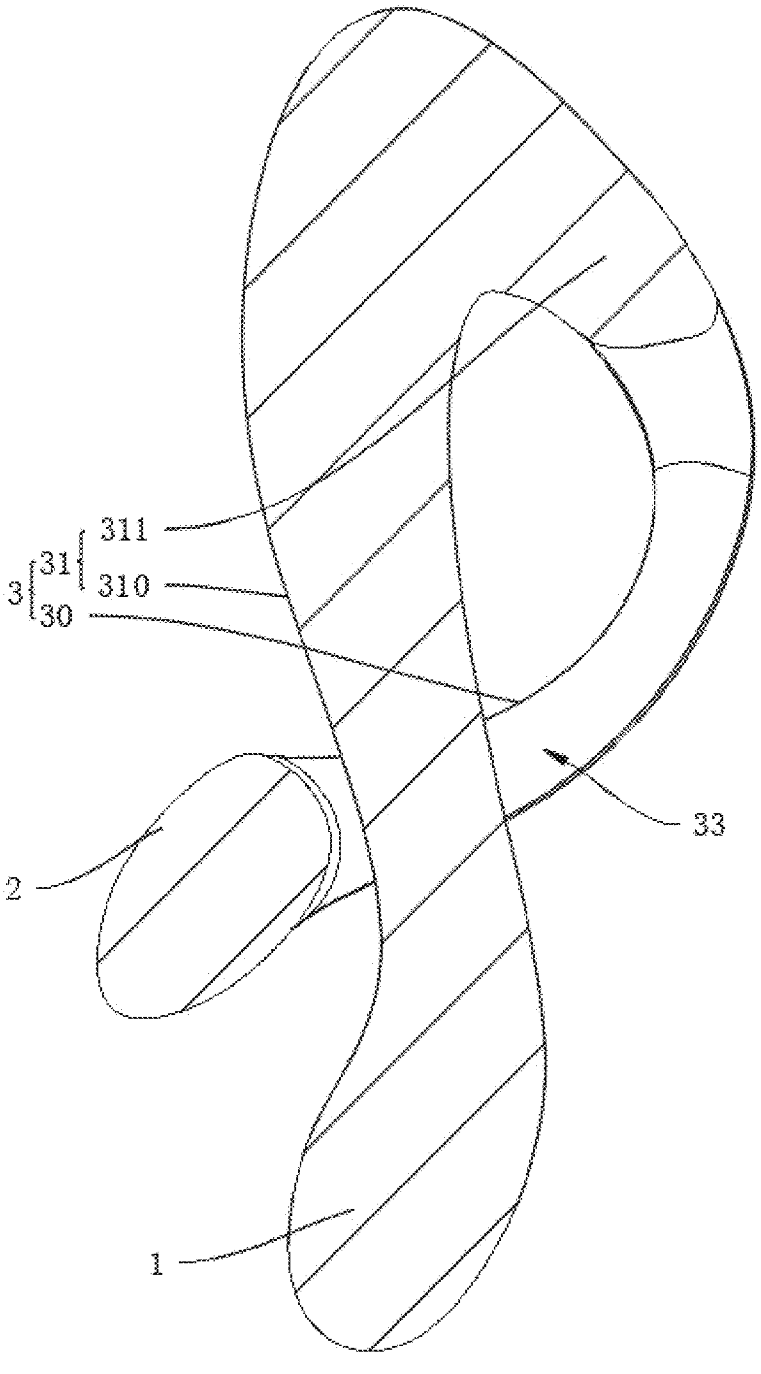
FIG. 17 is a sectional view of a massage device when a limiting structure is a second guide hole according to some embodiments of the present disclosure.

According to some embodiments of the present disclosure, optionally, as shown in FIGS. 15 to 17, the limiting structure is a second guide hole 33 formed on the deformation segment 30, and the long side 310 of the support segment 31 is inserted into the second guide hole 33.

When the user pushes the first massage assembly 1 to move further into the recess, the long side 310 of the support segment 31 goes deep synchronously with the first massage assembly 1 (a distal end of the long side 310 still remains in an extended state); the deformation segment 30 continues to slide toward the distal end along the long side 310, and the second guide hole 33 is always sleeved on the long side 310 to ensure that the deformation direction remains aligned; and the second massage assembly 2 cannot move synchronously with the first massage assembly 1 due to the reaction thrust of the second massage area, and only follows passively along the long side 310, which continuously fits the second massage area, without weakening of the tightly-abutting force.

The deformation segment 30 is directly sleeved on the long side 310 of the support segment 31 through the second guide hole 33, there is no need to align a relative position between a hole of the support segment 31 and the deformation segment 30, and during assembly, it is only necessary to sleeve the hole on the long side 310, which is suitable for mass assembly scenarios and improves efficiency.

According to some embodiments of the present disclosure, optionally, the deformation segment 30 and the second massage assembly 2 are detachably connected.

The detachable connection between the deformation segment 30 and the second massage assembly 2 allows the user to replace the second massage assembly 2 according to different massage areas and different massage preferences (such as gentle pressing and deep stimulation), thereby enhancing the versatility of the massage device. When the second massage assembly 2 is worn or the deformation segment 30 is damaged, only the damaged second massage assembly 2 or the deformation segment 30 needs to be replaced separately without need to replace the entire connecting assembly 3 (retaining the intact components such as the support segment 31 and the first massage assembly 1), thereby reducing maintenance costs; and additionally, the detachable design facilitates the separate cleaning of the second massage assembly 2, and prevents bacterial growth, thereby enhancing the hygiene of use.

Figure 10:
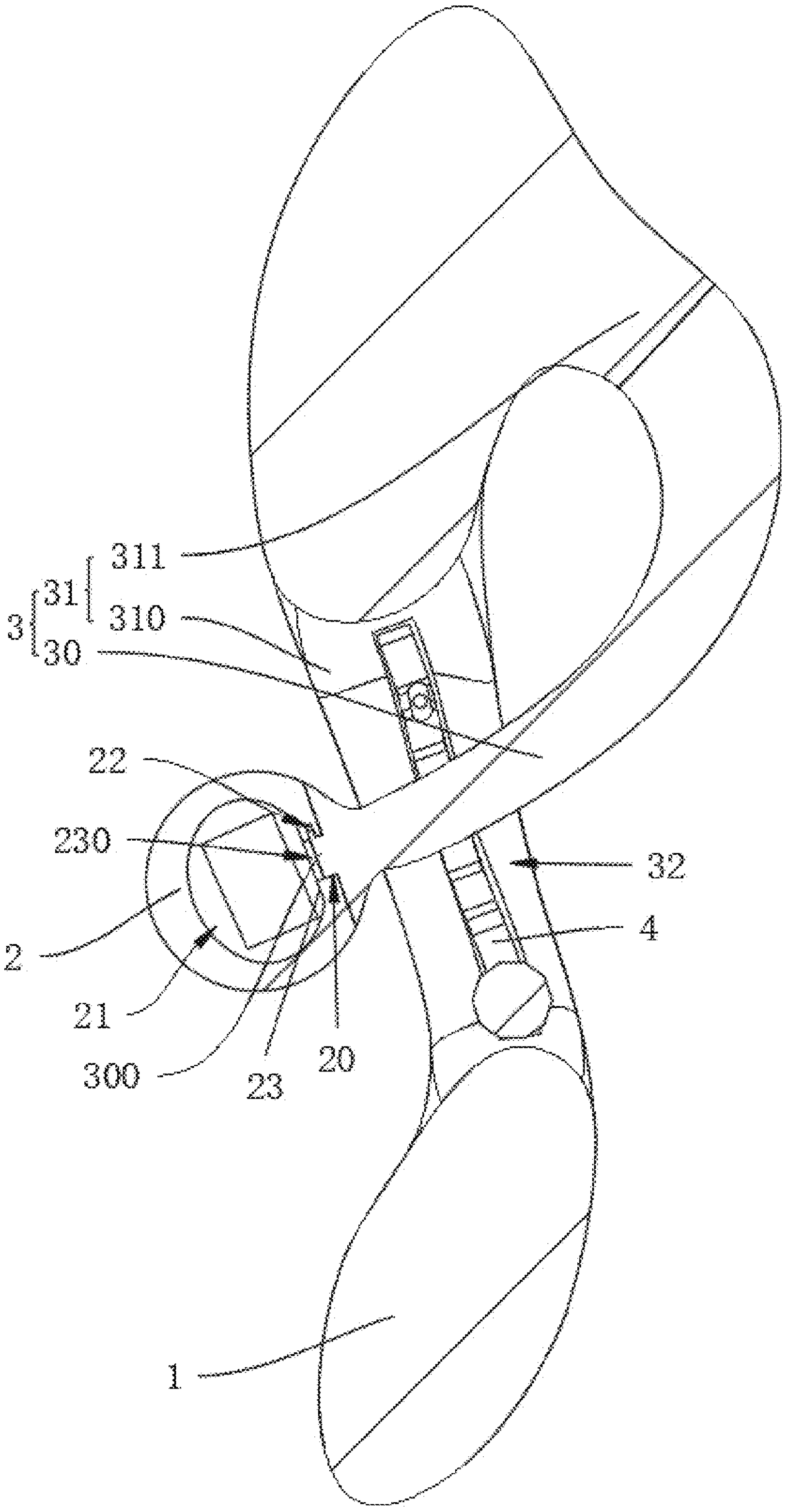
FIG. 10 is a sectional view of a massage device provided with a locking assembly according to some embodiments of the present disclosure.
Figure 11:
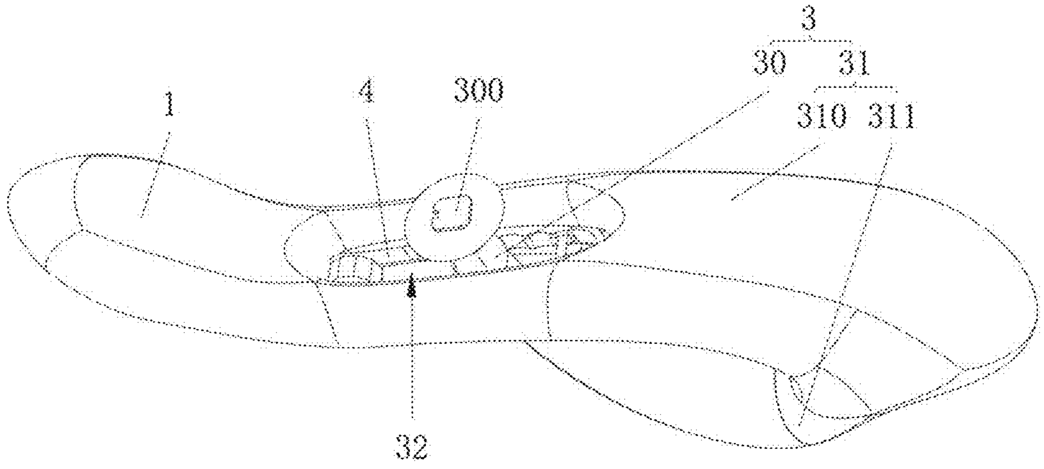
FIG. 11 is a schematic diagram of a partial structure of a massage device according to some embodiments of the present disclosure.
Figure 12:
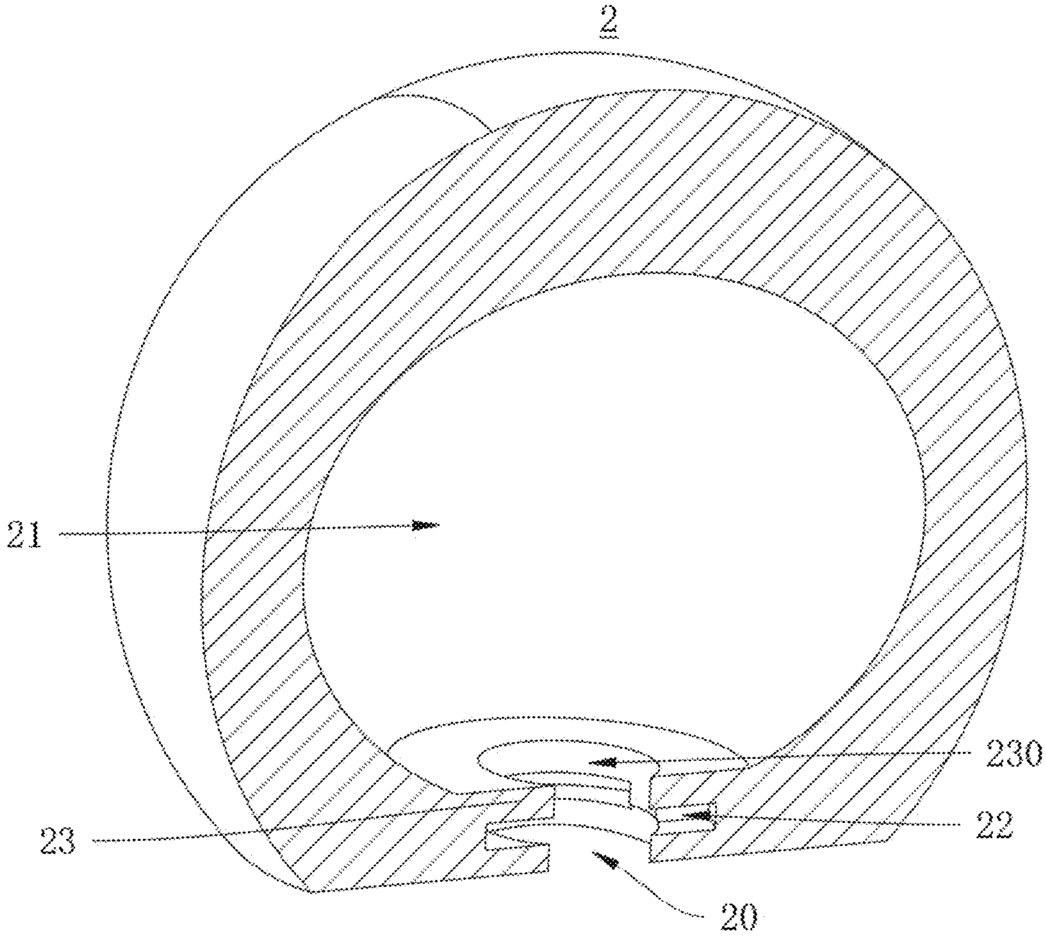
FIG. 12 is a schematic diagram of a partial internal structure of a second massage assembly according to some embodiments of the present disclosure.

According to some embodiments of the present disclosure, optionally, as shown in FIGS. 10 to 12, the second massage assembly 2 includes a first installation port 20, and a first accommodating cavity 21 and a second accommodating cavity 22 disposed in the second massage assembly 2; the first accommodating cavity 21 is configured to install a driving mechanism for driving the second massage assembly 2 to perform massage actions, the first accommodating cavity 21 communicates with the second accommodating cavity 22, and the second accommodating cavity 22 communicates with the first installation port 20; and the deformation segment 30 is provided with an installation portion 300, and the installation portion 300 extends into the second accommodating cavity 22 through the first installation port 20 and is snap-fitted with the second accommodating cavity 22.

In the present disclosure, the driving mechanism is disposed in the first accommodating cavity 21, and the enclosed accommodating cavities protect the driving mechanism, which reduces an impact of external factors on the driving mechanism, and prolongs the service life of the driving mechanism. A structure in which the installation portion 300 extends into the second accommodating cavity 22 for snap-fit engagement facilitates the disassembly and assembly (without need of complex steps such as screwing). The communication between the first accommodating cavity 21 and the second accommodating cavity 22, and the communication between the second accommodating cavity 22 and the first installation port 20 not only ensure that a line of the driving mechanism is smoothly connected to the power supply system, but also does not occupy a deformation space of the deformation segment 30; and when the deformation segment 30 drives the second massage assembly 2 to adjust a position, the driving mechanism in the accommodating cavity moves synchronously with the second massage assembly 2 without jamming or line entanglement, thereby ensuring that the second massage assembly 2 acts stably and continuously.

According to some embodiments of the present disclosure, optionally, as shown in FIGS. 10 and 12, a partition portion 23 configured to divide the two accommodating cavities is disposed between the first accommodating cavity 21 and the second accommodating cavity 22; and the first accommodating cavity 21 communicates with the second accommodating cavity 22 through a second installation port 230 disposed on the partition portion 23.

When there is no partition between the first accommodating cavity 21 and the second accommodating cavity 22, the driving mechanism easily deflects toward the second accommodating cavity 22 due to vibration during massage, which may interfere with a snap-fit structure of the installation portion 300; and the partition portion 23 limits the driving mechanism to move only in the first accommodating cavity 21, which prevents the massage action jamming caused by displacement, and enhances the operation stability of the driving mechanism. The partition portion 23 ensures that the first accommodating cavity 21 (configured to install the driving mechanism) and the second accommodating cavity 22 (configured to adapt to the installation portion 300) perform their respective functions, which neither affects the accommodation and protection of the driving mechanism by the first accommodating cavity 21, nor interferes with the snap-fit linkage between the second accommodating cavity 22 and the installation portion 300, thereby achieving more stable cooperation therebetween.

The present disclosure has been described with reference to preferred embodiments, but various modifications thereto may be made without departing from the scope of the present disclosure, and equivalents may be used to replace components therein. In particular, as long as there are no structural conflicts, various technical features mentioned in all embodiments may be combined in any manner. The present disclosure is not limited to specific embodiments disclosed herein but includes all technical solutions that fall within the scope of the claims.

What is claimed is:

1. A massage device, comprising:

a first massage assembly, configured to massage a first massage area of a user;

a second massage assembly, configured to massage a second massage area of the user, wherein the first massage area is different from the second massage area;

a connecting assembly, configured to connect the first massage assembly and the second massage assembly, wherein the connecting assembly comprises an elastic deformation segment;

at least a portion of the deformation segment and the second massage assembly are respectively located on opposite sides of an axis L1 of the first massage assembly;

the deformation segment is configured to deform under force so as to cause position changes in a projection of the second massage assembly on the axis L1; and a limiting structure, disposed on the connecting assembly, wherein the limiting structure is configured to restrict a motion stroke of the second massage assembly in a direction of the axis L1 of the first massage assembly and define a first limit position and a second limit position of motion.

2. The massage device according to claim 1, wherein at least a portion of the connecting assembly cooperates with the limiting structure to limit a deformation direction of the deformation segment.

3. The massage device according to claim 1, wherein the connecting assembly further comprises a support segment;

the support segment has a J-shaped structure, a long side thereof is connected to the first massage assembly, and a short side thereof is connected to the deformation segment;

the deformation segment is connected to the second massage assembly;

a length direction of the long side of the support segment is parallel to the axis L1; and the limiting structure limits deformation of the deformation segment along the long side of the support segment.

4. The massage device according to claim 3, wherein the limiting structure is a first guide hole disposed on the long side of the support segment, and the deformation segment is inserted into the first guide hole.

5. The massage device according to claim 4, wherein a size of the second massage assembly is larger than a diameter of the first guide hole to prevent the second massage assembly from penetrating through the first guide hole.

6. The massage device according to claim 4, wherein the first massage assembly has an arc-shaped structure.

7. The massage device according to claim 4, wherein a size of the second massage assembly is smaller than the diameter of the first guide hole, such that the second massage assembly penetrates through the first guide hole.

8. The massage device according to claim 4, wherein a cross-section of the first guide hole is waist-shaped.

9. The massage device according to claim 4, wherein the diameter of the first guide hole gradually increases in a direction away from the first massage assembly.

10. The massage device according to claim 3, wherein a size of the deformation segment gradually decreases from one end connected to the support segment to one end connected to the second massage assembly.

11. The massage device according to claim 3, wherein a bent portion between the long side and the short side of the support segment is an arc-shaped transition.

12. The massage device according to claim 3, wherein a power supply system configured to drive the first massage assembly and the second massage assembly to perform massage actions is disposed in a bent portion between the long side and short side of the support segment.

13. The massage device according to claim 3, wherein the limiting structure is a second guide hole formed on the deformation segment, and the long side of the support segment is inserted into the second guide hole.

14. The massage device according to claim 1, wherein the deformation segment and the second massage assembly are detachably connected.

15. The massage device according to claim 14, wherein the second massage assembly comprises a first installation port, and a first accommodating cavity and a second accommodating cavity disposed in the second massage assembly;

the first accommodating cavity communicates with the second accommodating cavity, and the second accommodating cavity communicates with the first installation port; and the deformation segment is provided with an installation portion, and the installation portion extends into the second accommodating cavity through the first installation port and is snap-fitted with the second accommodating cavity.

16. The massage device according to claim 15, wherein a partition portion configured to divide the two accommodating cavities is disposed between the first accommodating cavity and the second accommodating cavity; and the first accommodating cavity communicates with the second accommodating cavity through a second installation port disposed on the partition portion.

17. A massage device, comprising:

a first massage assembly, configured to massage a first massage area of a user;

a second massage assembly, configured to massage a second massage area of the user, wherein the first massage area is different from the second massage area;

a connecting assembly, configured to connect the first massage assembly and the second massage assembly, wherein the connecting assembly comprises a support segment, the support segment has a J-shaped structure, a long side thereof is connected to the first massage assembly, and a length direction of the long side is parallel to an axis L1 of the first massage assembly;

a limiting structure, disposed on the long side, wherein the limiting structure is configured to restrict a motion of the second massage assembly in a direction of the axis L1; and a locking assembly, disposed on the long side, wherein the locking assembly is configured to fix or loosen the second massage assembly.

18. The massage device according to claim 17, wherein the connecting assembly further comprises an elastic deformation segment;

the support segment further comprises a short side;

the deformation segment is connected between the short side and the second massage assembly;

at least a portion of the deformation segment and the second massage assembly are respectively located on opposite sides of an axis L1 of the first massage assembly; and the deformation segment is configured to deform under force so as to cause position changes in a projection of the second massage assembly on the axis L1.

19. The massage device according to claim 18, wherein the limiting structure is a first guide hole disposed on the long side of the support segment, and the deformation segment is inserted into the first guide hole; and the locking assembly fixes the second massage assembly by restricting deformation of the deformation segment.

20. The massage device according to claim 19, wherein the locking assembly comprises a pair of clamping portions; and the pair of the clamping portions is configured to move synchronously toward or away from the deformation segment to clamp or release the deformation segment.

* * * * *